R. SCHOLZ.
SADDLE ATTACHMENT FOR MOTORCYCLES AND THE LIKE.
APPLICATION FILED DEC. 19, 1918.
1,337,025.
Patented Apr. 13, 1920.
2 SHEETS—SHEET 1.
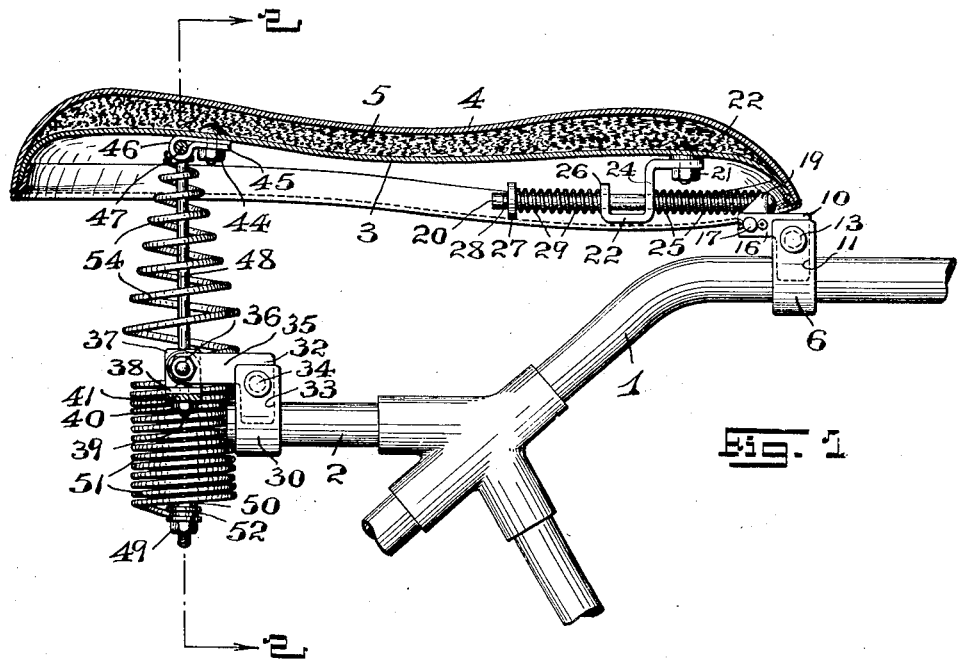
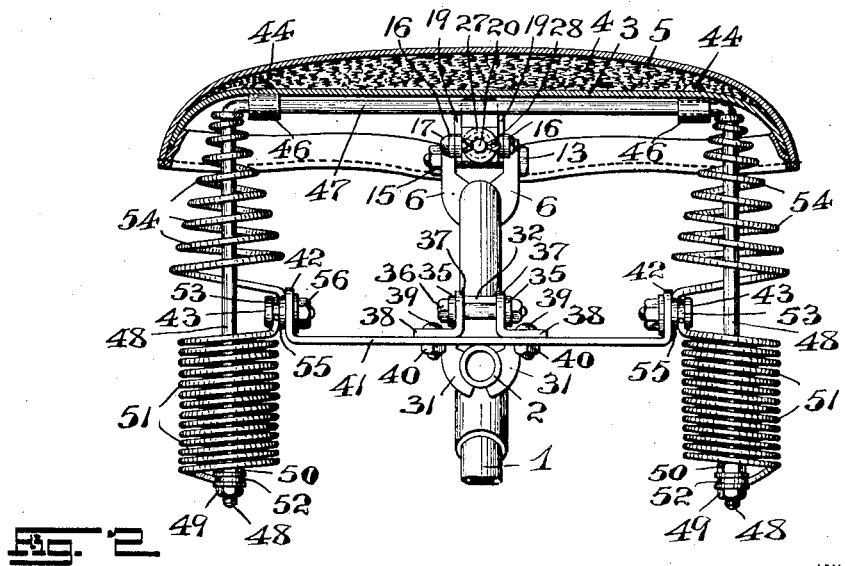
INVENTOR:
Rudolph Scholz,
BY
Fraentzel & Richards
ATTORNEYS R. SCHOLZ.
SADDLE ATTACHMENT FOR MOTORCYCLES AND THE LIKE.
APPLICATION FILED DEC. 19, 1918.
1,337,025.
Patented Apr. 13, 1920.
2 SHEETS—SHEET 2.
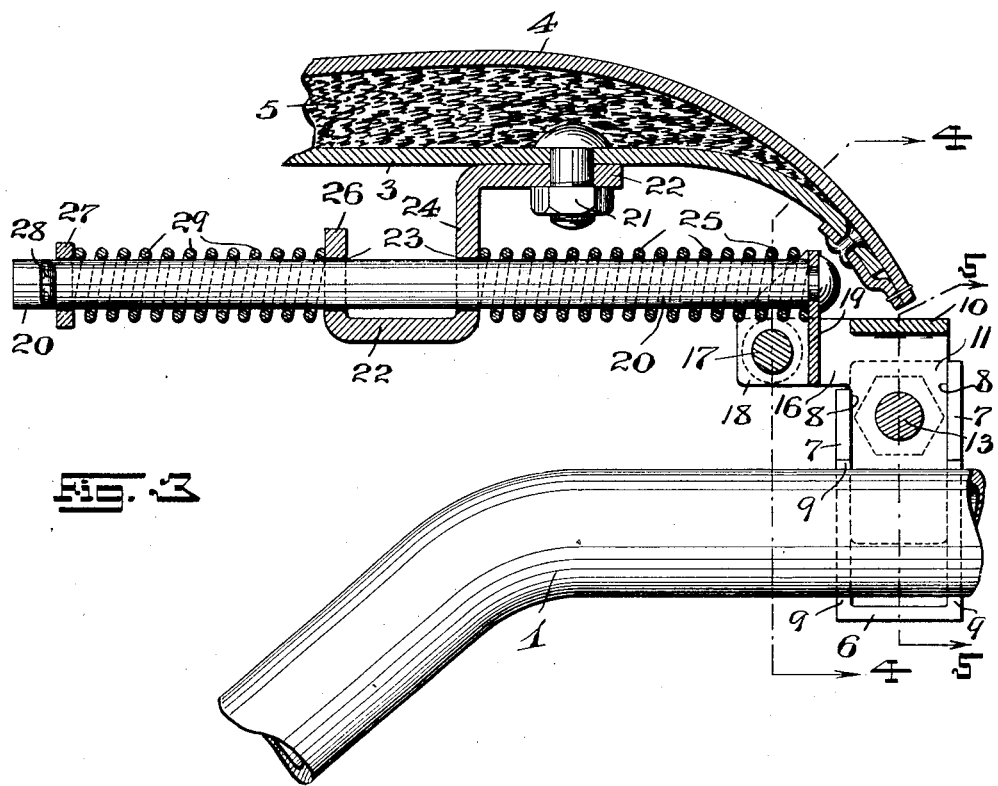
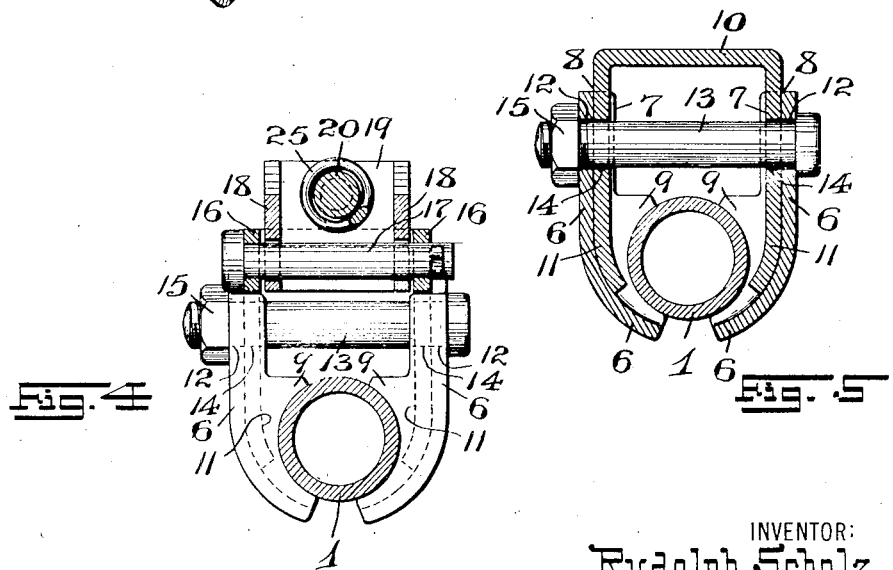
INVENTOR:
Rudolph Scholz,
BY
Fraentzel and Richards,
ATTORNEYS

UNITED STATES PATENT OFFICE.

RUDOLPH SCHOLZ, OF NEWARK, NEW JERSEY.

SADDLE ATTACHMENT FOR MOTORCYCLES AND THE LIKE.

1,337,025.   Specification of Letters Patent.   Patented Apr. 13, 1920.

Application filed December 19, 1918. Serial No. 267,435.

*To all whom it may concern:*

Be it known that I, RUDOLPH SCHOLZ, a citizen of the United States, residing at Newark, in the county of Essex and State of New Jersey, have invented certain new and useful Improvements in Saddle Attachments for Motorcycles and the like; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in saddles for motorcycles, bicycles, and the like; and, the invention relates, more particularly, to a floating resilient means for mounting a saddle upon the frame of a motorcycle, bicycle or the like.

The invention has for its principal object to provide a shock-absorbing mounting for the saddles of motorcycles, bicycles and the like, which is arranged to provide a resilient floating suspension of the saddle, adapted to absorb shocks and jars incident both to the vertical vibrations consequent upon traction, and to inertia-induced and more or less violent movement due to changes in speed, or sudden starting or stopping of the motorcycle, bicycle, or the like.

Other objects of the present invention, not at this time more particularly enumerated, will be clearly understood from the following detailed description of the same.

With the various objects of the present invention in view, the same consists, primarily, in the novel construction of resilient mounting for the saddles of motorcycles, bicycles, and the like, hereinafter set forth; and, the invention consists, furthermore, in the novel arrangements and combinations of the various devices and parts, as well as in the details of the construction of the same, all of which will be hereinafter more fully described, and then finally embodied in the claims appended to this specification.

The invention is clearly illustrated in the accompanying drawings, in which:—

Figure 1 is a part side elevation and part longitudinal vertical section of the novel saddle-mounting, made according to and embodying the principles of the present invention; Fig. 2 is a transverse vertical section of the same, taken on line 2—2 in said Fig. 1; Fig. 3 is a detail longitudinal vertical section of the mounting devices connected with the forward end or nose of the saddle, said view being drawn on an enlarged scale; Fig. 4 is a detail cross-section, taken on line 4—4 in said Fig. 3; and Fig. 5 is another detail cross-section, taken on line 5—5 in said Fig. 3.

Similar characters of reference are employed in all of the above described views, to indicate corresponding parts.

Referring now to the said drawings, the reference-character 1 indicates the frame of a motorcycle, bicycle, or the like, the same being preferably provided, in suitable location, with a rearwardly projecting extension or arm 2.

The reference character 3 indicates the base-plate or main body-member of the saddle, the same being preferably pressed out of sheet metal, and shaped to the desired outline and general contour of the complete saddle-seat. Extending over the upper surface of said base-plate or main body-member 3 is the saddle-covering 4, usually made of leather, and secured by its marginal edges to the marginal edges of said base-plate or main body-member by any suitable means, or in any desirable manner. Interposed between said base-plate or main body-member and said covering 4 is a suitable padding-material 5, for upholstering the saddle to provide a comfortable seat.

Connected with said frame 1, adjacent to the forward end or nose of the saddle, is a clamp-device comprising a pair of clamp plates 6, provided with side flanges 7 at their vertical marginal edges, providing channels 8 at their inner surfaces, the lower portions of said side flanges 7 being shaped to provide clamp-jaws 9 adapted to embrace the tubular body of said frame 1. Associated with said clamp-plates 6 is a yoke-piece 10 having a pair of downwardly extending arms 11 which are respectively disposed within the channels 8, so as to be embraced between the side flanges 7. The upper portions of said clamp-plates 6 are provided with openings 12 for the passage therethrough of a clamp-bolt 13, and, in like manner, each arm 11 of said yoke-piece 10 is provided with an opening 14 registering with the opening 12 of the adjacent clamp-plate through which said clamp-bolt 13 extends. A nut 15 screwing upon the threaded end of said bolt 13 serves to draw together the lower ends of said clamp-plates for the purpose of causing the clamp-jaws 9 to securely clamp upon the tubular body of the frame 1, whereby the clamp-device is securely and immovably connected to said frame 1. Integrally connected with the upper end of said yoke-piece 10 are a pair of rearwardly extending laterally spaced perforated ears or lugs 16, in and between which is supported a transverse fulcrum-pin 17. It will be apparent, that the relation of the yoke-piece 10 to the clamp-plates 6 is such that, when said parts are assembled in secured relation to the frame 1, said yoke-piece is held rigidly against movement, and consequently the ears or lugs 16, and the fulcrum-pin 17 supported thereby, are likewise immovably related in fixed positive relation to the frame 1.

Pivoted upon said fulcrum-pin 17 is a coupling-device 18 having an upwardly extending portion 19 to which is rigidly secured a rearwardly extending guide-rod 20. As thus coupled with said clamp-device, said guide-rod 20 is capable of a swinging or pivotal movement in a vertical plane. Secured to the under side of the forward end or nose of said base-plate or main body-member 3, by any suitable fastening means, such, for example, as the nut and bolt-device 21, is a downwardly projecting bearing-member 22, provided with openings 23 through which said guide-rod 20 extends. Said bearing-member 22, as thus related to said guide-rod 20, is capable of longitudinal slidable movement upon and relative to said guide-rod 20. Upon that portion of the guide-rod 20, and encircling the latter between the vertically extending portion 24 of said bearing-member 20 and the said upwardly extending portion 19 of the coupling-device 18 is a coiled spring, as 25, and similarly mounted upon that portion of the guide-rod 20, and encircling the latter between the vertically extending portion 26 of said bearing-member 20 and a collar 27 mounted upon said rod 20 and held in place by means of a pin 28, or other suitable securing means, is another coiled spring, as 29, all substantially as shown in Figs. 1 and 3 of the drawings, and the purposes of which springs will be self-evident from an inspection of said figures.

Connected with the rearwardly projecting extension 2 is a clamp-device, which is similar in construction to the construction of the previously-described clamp-device mounted upon the frame-member 1, said clamp-device comprising a pair of clamp-plates 30 with which are connected the clamp-jaws 31 adapted to embarce said extension or frame-member 2, substantially as shown in Fig. 2 of the drawings. Associated with said clamp-plates 30 is a yoke-piece 32 having a pair of downwardly extending arms 33 which are suitably disposed between the said clamp-plates 30 in the manner of the construction indicated more particularly in said Figs. 1 and 2 of the drawings. The upper portions of said clamp-plates 30 and the arms 33 of the yoke-piece 32 are provided with suitably disposed and registering openings for the passage therethrough of a clamp-bolt 34, by means of which the said clamp-device is securely fastened in its operative position upon said extension or frame-member 2. The said yoke-piece 32 is also provided with a pair of rearwardly extending laterally spaced perforated ears or lugs 35, in and between which is supported a transverse fulcrum-pin 36. It will be apparent, that the relation of the said yoke-piece 32 to the clamp-plates 30 is such that, when said parts are assembled in secured relation to the member 2, said yoke-piece is held rigidly against movement, and consequently the ears or lugs 35, and the fulcrum-pin 36 supported thereby, are likewise immovably related in fixed positive relation to said member 2 and the main frame of the vehicle.

Pivoted upon said fulcrum-pin 36 are a pair of coupling-devices 37 having the angularly extending members 38 to which is suitably secured, by means of bolts 39 and nuts 40, or other suitable fastening means, a laterally extending carrier-plate or bar 41, said plate or bar 41 being provided at its respective end-portions with upwardly projecting and perforated attaching arms or lugs, as 42. Each arm or lug carries in its perforation a stud or bolt 43 for the purpose to be presently more fully described.

Secured to the under side of the rear end-portion of the base-plate or main body member 3 of the saddle, in any suitable manner, as by means of the nut and bolt-devices 44 are a pair of pivot-members 45, in the eye-portions 46 of which is oscillatorily mounted a rod 47 formed at its respective end-portions with the downwardly extending rod-members or elements 48. Upon their lower free end-portions the said members or elements 48 are screw-threaded for the reception upon each screw-threaded portion of a pair of tightening nuts 49 and 50. The said nuts, as will be seen from an inspection of Figs. 1 and 2 of the drawings, are employed for securing the eye-portions 52 of suitable tension springs 51 between them upon the respective members or elements 48, said springs suitably encircling said members or elements, and each spring 51 having another eye-portion 53 which are disposed upon the previously mentioned bolts or studs 43 carried by the respective ears or lugs 42 of the plate or bar 41. The said members or elements 48 are also encircled by another pair of compression springs, as 54, the upper end-portions of said springs being held in place by means of the angularly bent portions of the rod 47 and the respective downwardly extending rod-members or elements 48, and the lower end-portions of said springs 54 being formed with eyes, as 55, which are disposed upon said bolts or studs 43, as clearly shown in Fig. 2 of the drawings. The eye-portions 53 and 55 of the respective springs 51 and 54 are positively secured upon the respective bolts or studs 43 by tightening up the nuts 56 with which the said bolts or studs are provided, as will be clearly understood.

From the foregoing description of the present invention, and from an inspection of the several figures of the drawings, it will readily be seen that a saddle-mount has been provided in which the saddle or seat is supported in such a manner that while the saddle has a pivotal action acting in conjunction with the tension and compression springs 51 and 54, the saddle or seat also has a reciprocatory action, due to the slidable disposition of the bearing-member 22 upon the guide-rod 20, against the action of the springs 25 and 29, so that the shocks due to starting or stopping, as well as the shocks caused when riding over rough and uneven roads, are taken up by said springs 25 and 29, in addition to the coaction of the springs 51 and 54, and of the rock-bar or rod 47 and the pivotal connection of the members 37 upon the bolt or pin 36, thus providing a most comfortable and easy-riding saddle which is more especially adapted for use with the frames of motorcycles of the various types.

Of course I am aware that changes may be made in the general arrangements and combinations of the various devices and parts, as well as in the details of the construction of the said parts, without departing from the scope of the present invention as set forth in the foregoing specification and as defined in the clauses of the claim which are appended to the said specification. Hence, I do not limit my present invention to the exact arrangements and combinations of the said devices and parts as described in the said specification, nor do I confine myself to the exact details of the construction of the said parts, as illustrated in the accompanying drawings.

I claim:—

1. In combination with the frame of a motorcycle, and the like, a saddle bearing-member secured to and extending from the lower face of said saddle, a horizontally disposed guide-rod upon which said bearing-member is slidably mounted, means for mounting said guide-rod upon said frame, and coil-springs encircling said rod on opposite sides of said bearing-member, said springs coöperating with the saddle to produce a substantially horizontal reciprocatory shock-absorbing motion of said saddle.

2. In combination with the frame of a motorcycle, and the like, a saddle, a bearing-member secured and extending from the lower face of said saddle, a horizontally disposed guide-rod upon which said bearing-member is slidably mounted, a means of pivotal connection for oscillatorily mounting said guide-rod upon said frame, and coil-springs encircling said rod on opposite sides of said bearing-member, said springs coöperating with the saddle to produce a substantially horizontal reciprocatory shock-absorbing motion of said saddle.

3. In combination with the frame of a motorcycle, and the like, a saddle bearing-member secured to and extending from the lower face of said saddle, a horizontally disposed guide-rod upon which said bearing-member is slidably mounted, means for mounting said guide-rod upon said frame, and coil-springs encircling said rod on opposite sides of said bearing-member, said springs coöperating with the saddle to produce a substantially horizontal reciprocatory shock-absorbing motion of the saddle, and mechanism at the rear portion of the saddle for producing a substantially vertical shock-absorbing motion.

4. In combination with the frame of a motorcycle, and the like, a saddle, a bearing-member secured and extending from the lower face of said saddle, a horizontally disposed guide-rod upon which said bearing-member is slidably mounted, a means of pivotal connection for oscillatorily mounting said guide-rod upon said frame, and coil-springs encircling said rod on opposite sides of said bearing-member, said springs coöperating with the saddle to produce a substantially horizontal reciprocatory shock-absorbing motion of said saddle, and mechanism at the rear portion of the saddle for producing a substantially vertical shock-absorbing motion.

5. In combination with the frame of a motorcycle, and the like, a saddle, a clamp-device mounted upon said frame, a bearing-member secured to and extending from the lower face of said saddle, a horizontally disposed guide-rod upon which said bearing-member is slidably mounted, said guide-rod being connected at one end with said clamp-device, and coil-springs encircling said rod on opposite sides of said bearing-member to permit of a reciprocatory shock-absorbing motion of the saddle.

6. In combination with the frame of a motorcycle, and the like, a saddle, a clamp-device mounted upon said frame, a means of pivotal connection connected with and extending from said clamp-device, a guide-rod connected at one end with said means of pivotal connection, a bearing-member secured to and extending downwardly from said saddle, said bearing-member having perforated portions into and through which said guide-rod extends to permit of a pivotal as well as a reciprocatory shock-absorbing motion of said saddle, and coiled compression springs mounted upon said guide-rod upon opposite sides of said bearing-member.

7. In combination with the frame of a motorcycle, and the like, a saddle, a clamp-device comprising a pair of clamp-plates, said plates having clamp-jaws adapted to embrace a member of said frame, a yoke-piece disposed between said clamp-plates, a clamp-bolt extending through said plates and said yoke-piece for clamping said members in assembled relation upon said frame-member, perforated lugs extending from said yoke-piece, a fulcrum-pin connected with said perforated lugs, a coupling-device oscillatorily mounted upon said fulcrum-pin, a guide-rod connected with and extending from said coupling-device, and means connected with and extending from said saddle, and slidably mounted upon said guide-rod to permit of a pivotal as well as a reciprocatory shock-absorbing motion of said saddle.

8. In combination with the frame of a motorcycle, and the like, a saddle, a clamp-device comprising a pair of clamp-plates, said plates having clamp-jaws adapted to embrace a member of said frame, a yoke-piece disposed between said clamp-plates, a clamp-bolt extending through said plates and said yoke-piece for clamping said members in assembled relation upon said frame-member, perforated lugs extending from said yoke-piece, a fulcrum-pin connected with said perforated lugs, a coupling-device oscillatorily mounted upon said fulcrum-pin, a guide-rod connected with and extending from said coupling-device, and a bearing-member secured to and extending downwardly from said saddle, said bearing-member having perforated portions into and through which said guide-rod extends to permit of a pivotal as well as a reciprocatory shock-absorbing motion of said saddle.

9. In combination with the frame of a motorcycle, and the like, a saddle, a clamp-device comprising a pair of clamp-plates, said plates having clamp-jaws adapted to embrace a member of said frame, a yoke-piece disposed between said clamp-plates, a clamp-bolt extending through said plates and said yoke-piece for clamping said members in assembled relation upon said frame-member, perforated lugs extending from said yoke-piece, a fulcrum-pin connected with said perforated lugs, a coupling-device oscillatorily mounted upon said fulcrum-pin, a guide-rod connected with and extending from said coupling-device, a bearing-member secured to and extending downwardly from said saddle, said bearing-member having perforated portions into and through which said guide-rod extends to permit of a pivotal as well as a reciprocatory shock-absorbing motion of said saddle, and coiled compression springs mounted upon said guide-rod upon either side of said bearing-member.

In testimony that I claim the invention set forth above I have hereunto set my hand this 13th day of December, 1918.

RUDOLPH SCHOLZ.

Witnesses:
OSCAR HAISSER,
M. LOEFFLER.